US009055730B2

(12) United States Patent
Isenberg et al.

(10) Patent No.: US 9,055,730 B2
(45) Date of Patent: Jun. 16, 2015

(54) FOOD PROCESSING VAT WITH ZONED TEMPERATURE CONTROL

(75) Inventors: Timothy J. Isenberg, Marshfield, WI (US); John E. Zirbel, Marshfield, WI (US)

(73) Assignee: Cheese & Whey Systems, Inc., Marshfield, WI (US)

( * ) Notice: Subject to any disclaimer, the term of this patent is extended or adjusted under 35 U.S.C. 154(b) by 502 days.

(21) Appl. No.: 13/088,956

(22) Filed: Apr. 18, 2011

(65) Prior Publication Data

US 2011/0256288 A1 Oct. 20, 2011

Related U.S. Application Data

(60) Provisional application No. 61/325,612, filed on Apr. 19, 2010.

(51) Int. Cl.
| A47J 39/00 | (2006.01) |
| A23C 19/00 | (2006.01) |
| A01J 25/00 | (2006.01) |
| A01J 9/04 | (2006.01) |
| A23L 3/00 | (2006.01) |
| A23L 3/16 | (2006.01) |

(52) U.S. Cl.
CPC ........ *A01J 25/001* (2013.01); *A01J 9/04* (2013.01); *A23L 3/003* (2013.01); *A23L 3/16* (2013.01)

(58) Field of Classification Search
CPC ............ A01J 9/04; A01J 25/001; A23L 3/16; A23L 3/003
USPC ............. 99/452, 453, 455; 426/520, 521, 524
See application file for complete search history.

(56) References Cited

U.S. PATENT DOCUMENTS

| 299,685 A | 6/1884 | Schwarzschild |
| 2,814,114 A | 11/1957 | Nessler et al. |
| 3,541,687 A | 11/1970 | Peters |
| 3,733,702 A | 5/1973 | Robertson et al. |
| 3,751,010 A | 8/1973 | Latinen |
| 3,847,616 A | 11/1974 | Kaneko et al. |
| 3,858,855 A | 1/1975 | Hazen |
| 3,910,812 A | 10/1975 | Kaneko et al. |

(Continued)

FOREIGN PATENT DOCUMENTS

| DE | 3145388 | 8/1983 |
| EP | 0770333 | 5/1997 |

(Continued)

OTHER PUBLICATIONS

Communication from the European Patent Office, Opposition, Additional Facts and Arguments, dated Apr. 1, 2014, Appln. No. 11163028.1, 14 pages.

(Continued)

*Primary Examiner* — Jianying Atkisson
(74) *Attorney, Agent, or Firm* — Boyle Fredrickson, S.C.

(57) ABSTRACT

A food processing vat is provided with a zoned heat transfer system that provides zoned temperature control to the vat. The zoned heat transfer system selectively transmits heat to or removes heat from different portions of a bottom wall and/or side wall(s) of the vat. A heat transfer fluid may be directed through the zoned heat transfer system along a flow path that is selected based on a target size and/or a target temperature of a batch of food product being processed in the vat.

13 Claims, 6 Drawing Sheets

(56) References Cited

U.S. PATENT DOCUMENTS

| | | | |
|---|---|---|---|
| 3,988,011 A | | 10/1976 | Kressin |
| 4,050,369 A | | 9/1977 | Eakes |
| 4,275,568 A | * | 6/1981 | Zielsdorf .................. 62/342 |
| 4,321,860 A | | 3/1982 | Hazen |
| 4,479,423 A | | 10/1984 | Schwitters et al. |
| 4,628,805 A | | 12/1986 | Derode |
| 4,938,424 A | | 7/1990 | Pittelko |
| 4,989,504 A | | 2/1991 | Jay |
| 5,178,060 A | | 1/1993 | Rusch et al. |
| 5,327,818 A | | 7/1994 | Olivetti |
| 5,513,559 A | | 5/1996 | Jay |
| 5,568,835 A | * | 10/1996 | LaCount et al. .............. 165/140 |
| 5,606,907 A | | 3/1997 | Jay |
| 5,863,579 A | | 1/1999 | Muzzarelli |
| 5,985,347 A | | 11/1999 | Ejnik |
| 6,079,323 A | | 6/2000 | Dzenis |
| 6,482,460 B1 | | 11/2002 | Pikus et al. |
| 2006/0057249 A1 | * | 3/2006 | Bell et al. .................. 426/36 |
| 2007/0014893 A1 | | 1/2007 | Misson et al. |
| 2008/0127834 A1 | | 6/2008 | Bokelmann et al. |

FOREIGN PATENT DOCUMENTS

| | | |
|---|---|---|
| FR | 2561075 | 2/1985 |
| GB | 1444534 | 8/1976 |

OTHER PUBLICATIONS

Communication from the European Patent Office, Notice of Opposition dated Jan. 23, 2014, Appln. No. 11163028.1, 22 pages.

Dairy Processing Handbook, Chapter 14, pp. 301-344.

* cited by examiner

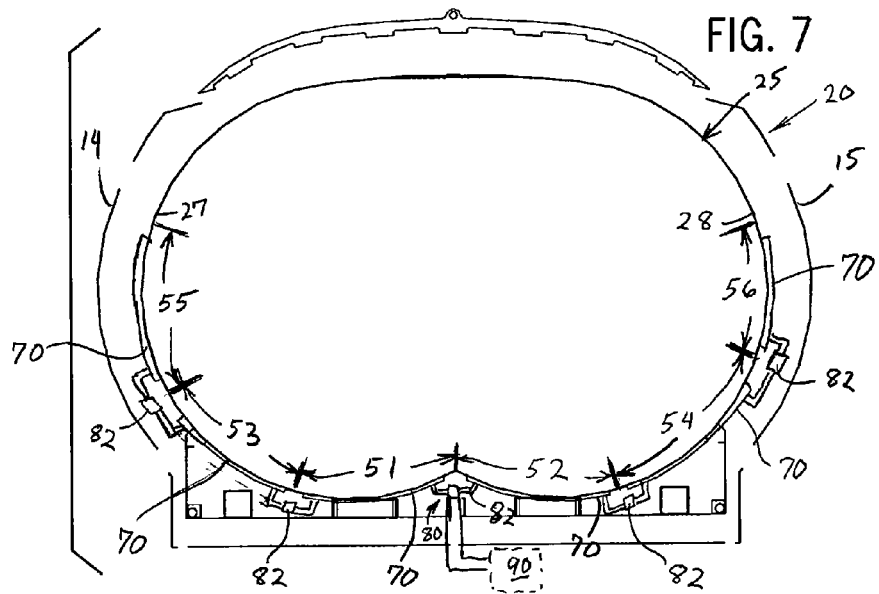
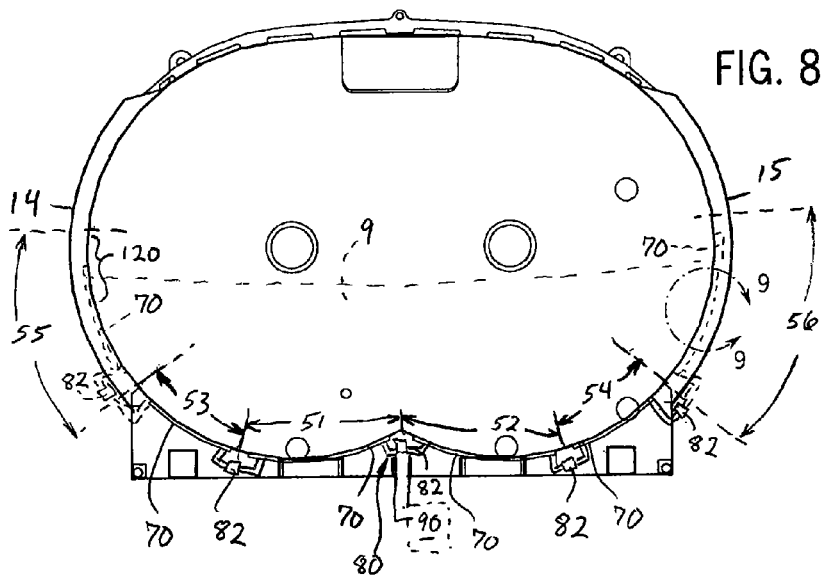

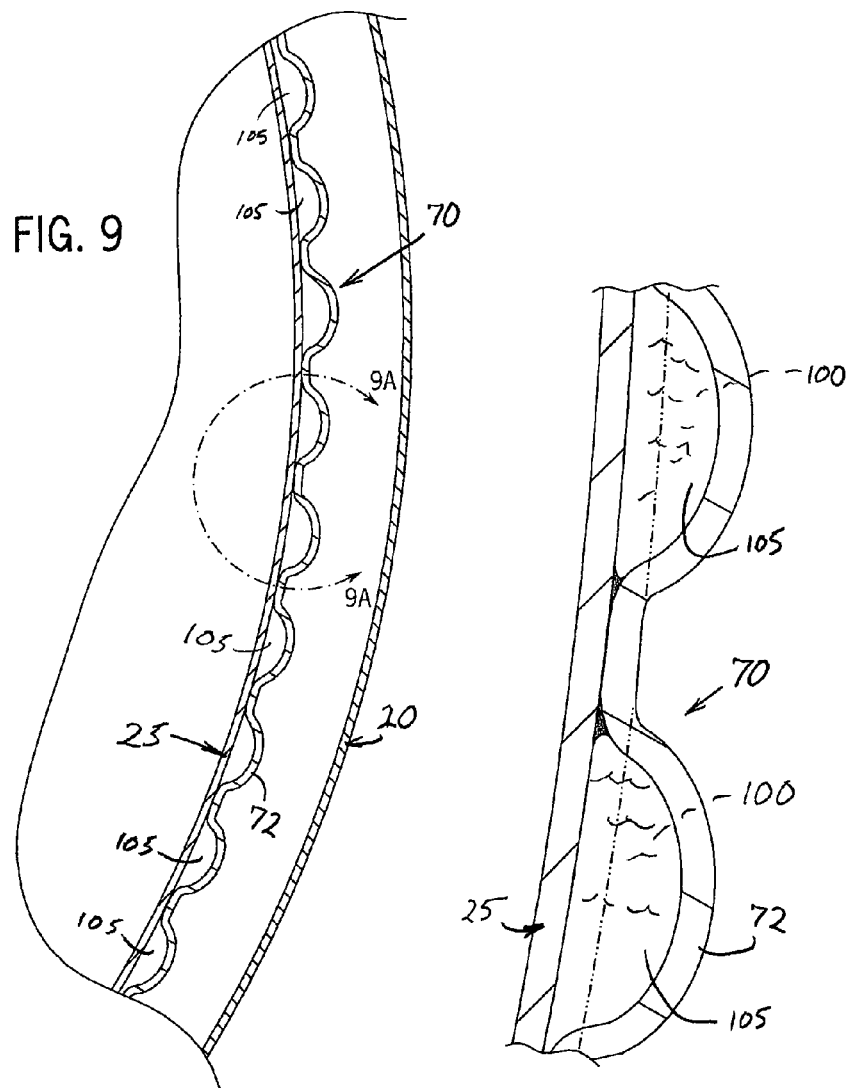

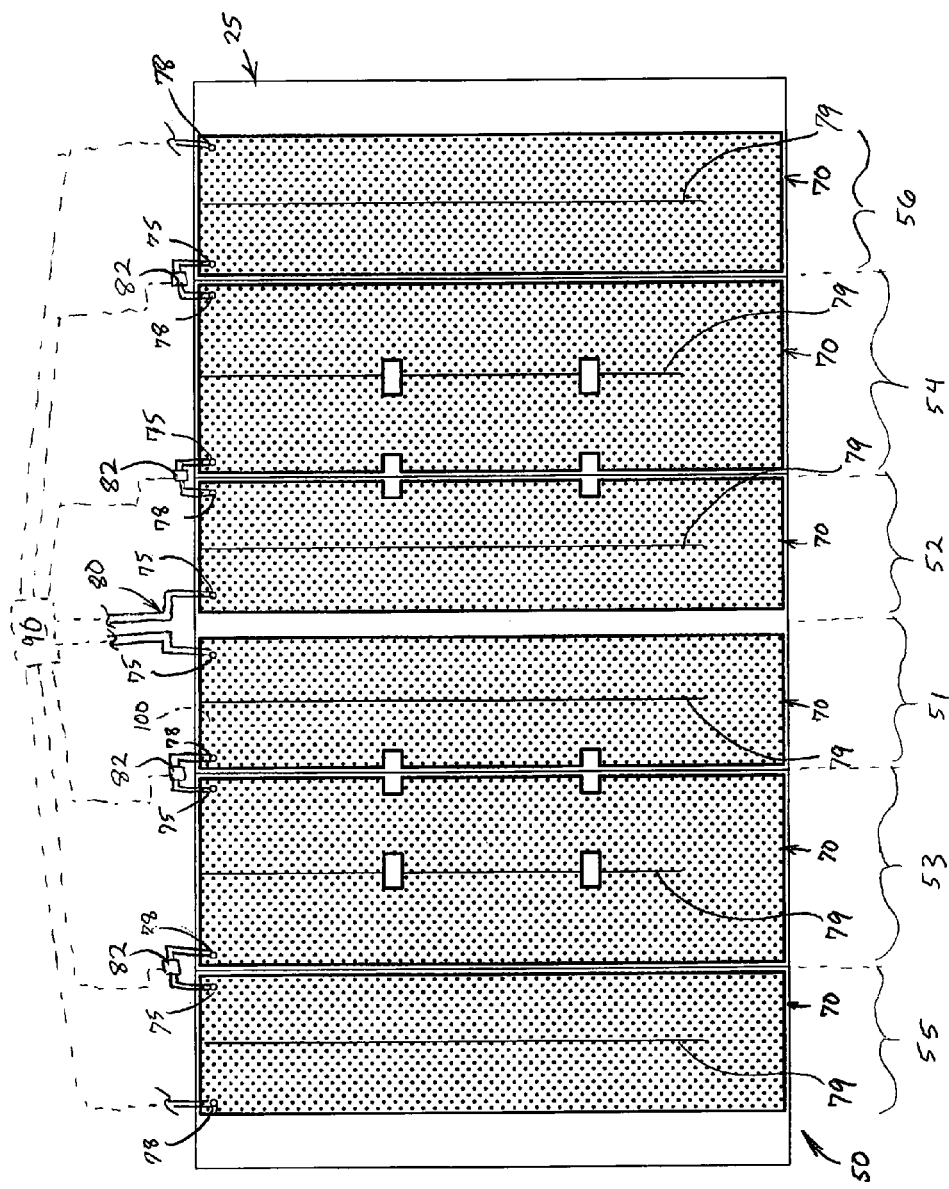

FOOD PROCESSING VAT WITH ZONED TEMPERATURE CONTROL

CROSS-REFERENCE TO RELATED APPLICATIONS

This application claims priority from U.S. Provisional Patent Application Ser. No. 61/325,612 filed on Apr. 19, 2010, the entirety of which is expressly incorporated by reference herein.

BACKGROUND OF THE INVENTION

1. Field of the Invention

The invention relates to food processing vats and, more particularly, to temperature control systems of food processing vats.

2. Discussion of the Related Art

Temperature control systems for use in food processing vats are known in the food processing industries. Such systems are widely used in equipment for processing liquid or semi-liquid food products, such as cheese vats.

Temperature control systems used in cheese vats typically have hollow jackets that cover sidewalls of the vat. Steam, heated liquid, or cool liquid is introduced into the jacket. Introducing steam or heated liquid into the jacket warms the sidewalls of the vat and thus also warms the vat contents. Introducing cool liquid into the jacket cools the sidewalls of the vat and thus also cools the vat contents.

SUMMARY OF THE INVENTION

The inventors have recognized that in food processing vats, different parts of the vat influence the food being processed in the vats in different ways. The inventors have also recognized that in cutting, stirring, and/or agitating vats, sloshing and splashing of the food being processed produces thin films or layers of the food that cling to and run down a splash-zone portion of an inner surface of the vat. The inventors have further recognized that in temperature controlled vats, the splash-zone tends to heat or cool the food layers running down them more quickly than the main mass of food that is heated or cooled by the corresponding portion of the vat, which may lead to overheating or overcooling of the food layers running down the splash-zone. The present invention contemplates a zoned heat transfer system that provides zoned temperature control and addresses these and other inventor-identified problems and drawbacks of the prior art.

In accordance with one aspect of the invention, a vat is provided that includes a bottom wall, side walls extending upwardly from the bottom wall, and a zoned heat transfer system for selectively transmitting heat to or removing heat from different portions of at least one of the bottom and side walls of the vat. The zoned heat transfer system may include at least one lower heat transfer zone and at least one upper heat transfer zone. The lower heat transfer zone may extend across the vat bottom wall and the upper heat transfer zone may extend across each of the vat side walls. This allows less heating or less cooling to occur in portions of the vat that are more susceptible to overheating or overcooling the vat contents.

In accordance with another aspect of the invention, multiple lower and/or multiple upper heat transfer zones may extend across the vat lower and side walls, respectively. The multiple lower and/or upper heat transfer zones may include at least a pair of lower and a pair of upper heat transfer zones. In one embodiment, intermediate heat transfer zones are provided between the lower and upper heat transfer zones. Respective pairs of the heat transfer zones may be controlled separately with respect to other pairs of the heat transfer zones. The two heat transfer zones of each simultaneously controlled pair may be provided at opposite side walls of the vat, so that by controlling the respective pairs of zones, temperature changes along the height of the vat are mirrored on both sides of the vat, as a reflection about a longitudinally extending centerline of the vat. In another embodiment, each of the multiple heat transfer zones may be controllable separately with respect to the other heat transfer zones, and/or in pairs with respect to other pairs of heat transfer zones. Separate controllability of heat transfer activity of the various heat transfer zones may help control instances of overheating or overcooling that may occur at about the same height on different walls of the vat.

In accordance with another aspect of the invention, transmitting heat to or removing heat from different portions of the vat is accomplished by circulating a heat transfer fluid through the zoned heat transfer system. The heat transfer fluid may be heated for transmitting heat to the at least one of the bottom and side walls of the vat and/or unheated, optionally cooled, for removing heat from the at least one of the bottom and side walls of the vat. A diverter system may direct flow of the heat transfer fluid through the zoned heat transfer system. The diverter system selectively may direct the heat transfer fluid to flow through various heat transfer zones and prevent the heat transfer fluid from flowing through other heat transfer zones, based on the requirements for processing a particular batch of food product, which may provide for a substantial amount of control and tunability to the heat transfer system so that the vat can accommodate vastly different materials and/or processes.

In accordance with another aspect of the invention, the heat transfer zones are connected to each other in series, such that a heat transfer fluid flows sequentially through the respective heat transfer zones, and the diverter system controls which one(s) of the heat transfer zones that the heat transfer fluid can flow through. Additionally or instead, the heat transfer zones may be connected to each other in parallel, such that a heat transfer fluid is divided and simultaneously flows through the respective heat transfer zones. Each of the heat transfer zones may include a heat exchanger and the respective inlets and outlets of the heat exchangers may be connected to each other, with intervening diverters of the diverter system, so as to establish the series and/or parallel connections of the heat transfer zones, allowing for control versatility to accommodate different materials and/or processes.

In accordance with another aspect of the invention, a method of processing food in a vat includes determining (i) a target size of a batch of food product to be processed in a vat, and (ii) a target temperature for processing the batch of food product within the vat. A heat transfer fluid is delivered to a zoned heat transfer system of the vat for transmitting heat to or removing heat from the batch of food product and is directed through the zoned heat transfer system along a flow path that is selected based on at least one of the target size and target temperature of the batch of food product. A temperature differential may be established between two heat transfer zones of the heat transfer system. A temperature of one of the two heat transfer zones may be heated or cooled to a temperature that defines a first component of the temperature differential, which substantially corresponds to the target temperature for processing the batch of food, allowing for control versatility to accommodate different batches while reducing the likelihood of overheating or overcooling layers of the food that may be running down the splash-zone toward the rest of the food.

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the Drawings:

FIG. 7 is partially schematic sectional view of the vat system of FIG. 1;

FIG. 8 is another partially schematic sectional view of the vat system of FIG. 1;

FIG. 9 is a sectional view of a heat exchanger of FIG. 8, taken at the curved line 9-9 of FIG. 8;

FIG. 9A is a close-up sectional view of the heat exchanger of FIG. 9, taken at the curved line 9A-9A; and FIG. 10 is a schematic view of a zoned heat transfer system.

DETAILED DESCRIPTION OF THE INVENTION

Figure 1:
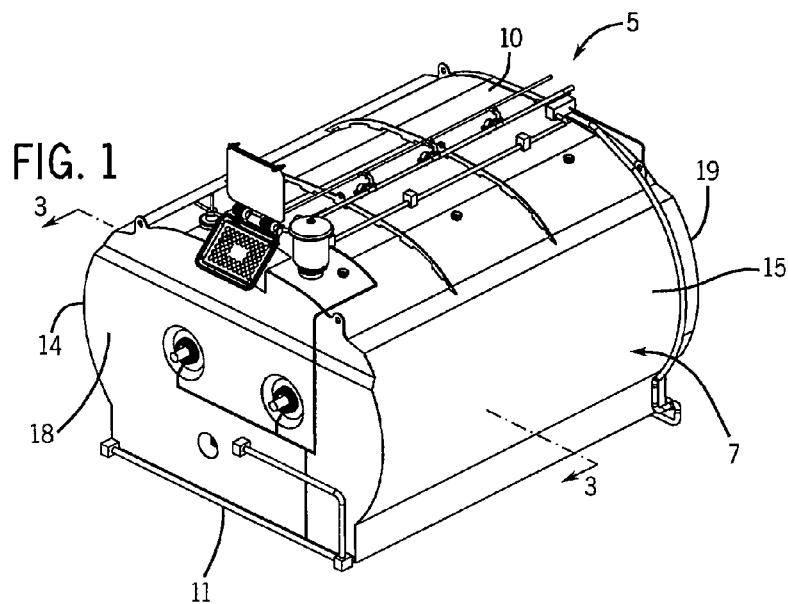
FIG. 1 is an isometric view from above and in front of a vat system incorporating a zoned heat transfer system in accordance with the present invention.
Figure 2:
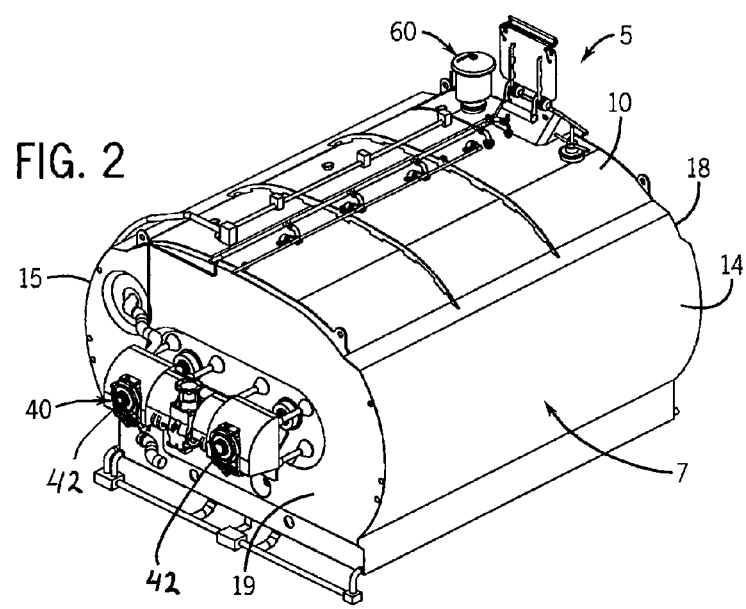
FIG. 2 is an isometric view from above and in back of the vat system of FIG. 1.

FIGS. 1 and 2 illustrate a vat system 5 that can be used for processing food and related products (collective referred to as "vat contents 9") by mechanically manipulating and heating or cooling the vat contents 9, depending on the particular food or related product being processed. In a representative application, the vat system 5 may be used in the production of cheese, although it is understood that the vat system 5 may be used in processing other types of food products. It is also understood that the vat system 5 may be used for processing non-food liquid or semi-liquid compositions. The vat system 5 includes a vat 7 that has an agitation system 40 which performs the mechanical manipulations tasks by delivering power through a pair of drives 42 (FIG. 2) that rotate a pair of shafts 45 (FIG. 3) upon which blade assemblies are mounted, and a zoned heat transfer system 50 to perform such heating and/or cooling to provide zoned temperature control to the vat 7.

Referring now to FIGS. 1-4, vat 7 defines an enclosure having a top wall 10, a bottom wall 11, and side walls 14, 15, all of which extend longitudinally between a pair of end walls 18 and 19. The walls 10, 11, 14, 15, 18, 19 are multilayered, having an outer jacket 20 and an inner shell 25 (FIGS. 3 and 4) that are spaced from each other. Insulation and various components of the zoned heat transfer system 50 are housed between the jacket 20 and shell 25. Shown best in FIG. 3, the shell 25 is the inmost structure of the vat 7, so that its inner surface surrounds and defines an outer periphery of a void or inside space 8 within the vat 7. A lower part of the inside space 8 resembles two horizontal parallel cylinders that transversely intersect each other, being defined by a bottom wall 26 of the shell 25 that has a pair of arcuate depressions which extend along the length of the vat 7, on opposing sides of a longitudinally extending raised middle segment. From the opposing sides of the shell bottom wall 26, opposing shell side walls 27, 28 extend in an outwardly bowed manner, arching away from each other in a transverse direction of the vat 7. A shell top wall 29 arcs gradually between top edges of the shell side walls 27, 28 and defines an upper perimeter of the inside space 8 of vat 7.

Figure 3:
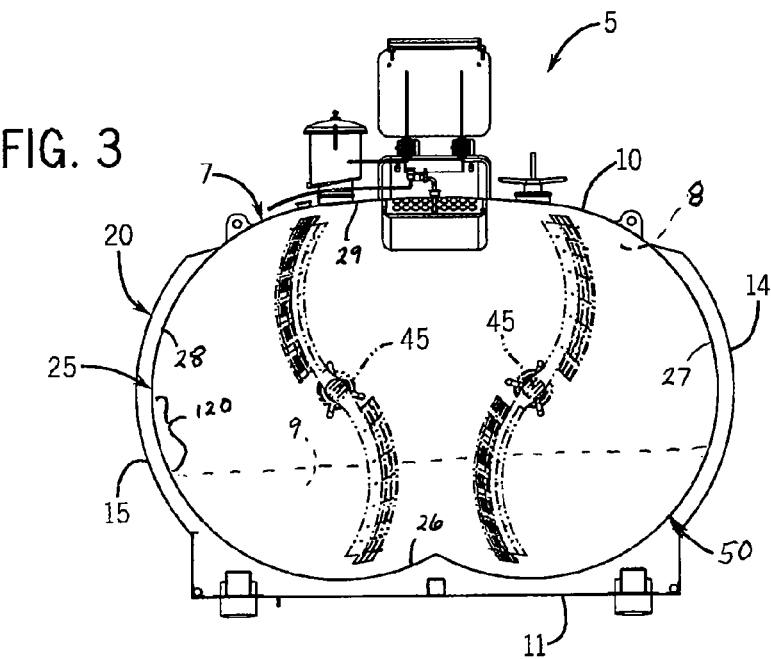
FIG. 3 is a sectional view of the vat system of FIG. 1, taken at line 3-3 of FIG. 1.
Figure 4:
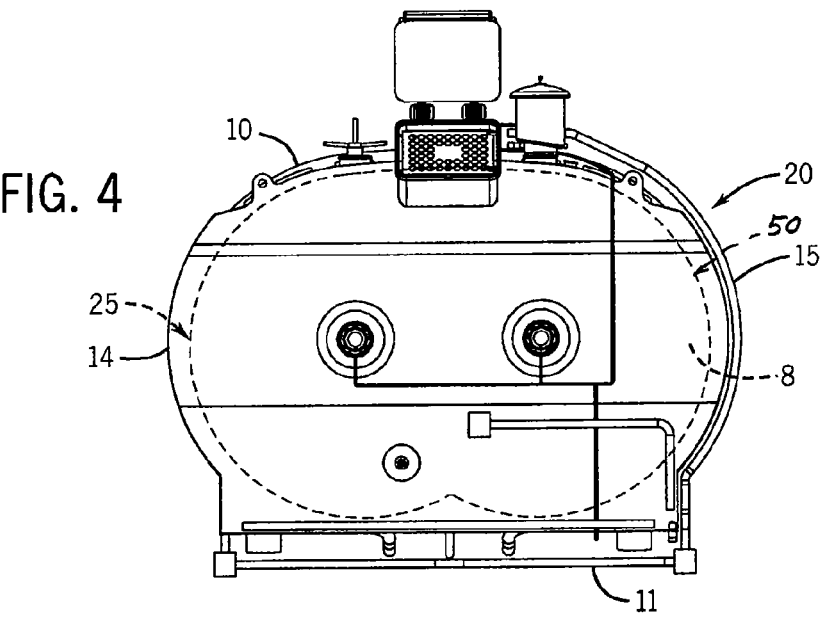
FIG. 4 is another sectional view of the vat system of FIG. 1.

Referring now to FIGS. 3 and 4, the inside space 8 of vat 7 and the food product, in other words the vat contents 9, are heated and/or cooled with the zoned heat transfer system 50 by selectively transmitting heat through or removing heat from different portions of one or more of the vat bottom and side walls 11, 14, 15, respectively. The amount of heat to transmit to or remove from the vat contents, as well as the particular portions of the vat 7 from which to transmit heat to or remove heat from, are selected based on a target batch size and/or target temperature of the vat contents, explained in more detail elsewhere herein.

Figure 5:
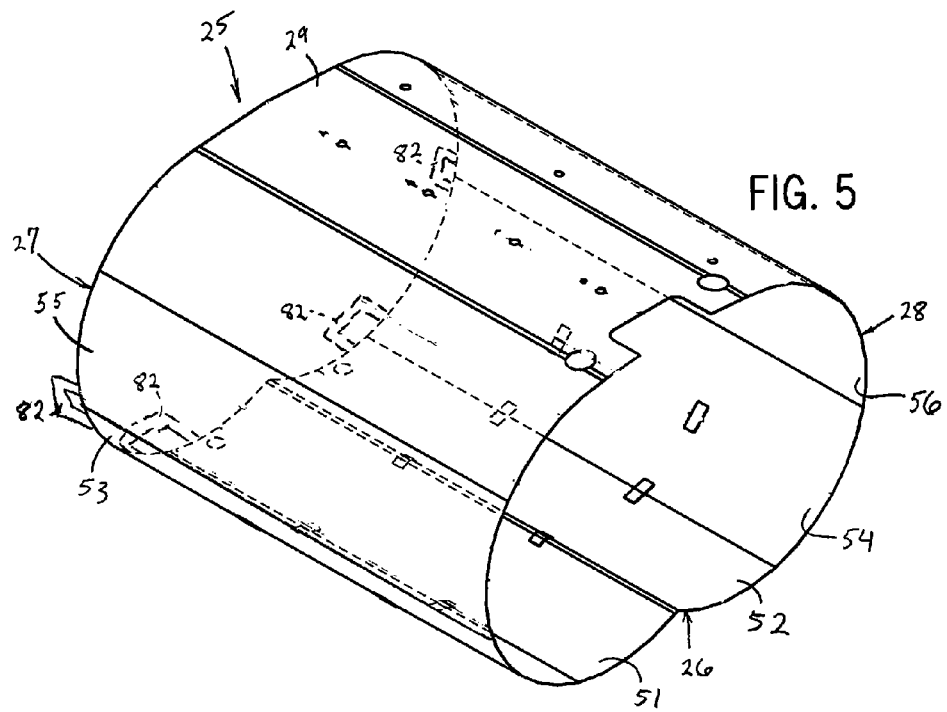
FIG. 5 is a schematic isometric view of a shell incorporating a zoned heat transfer system.
Figure 6:
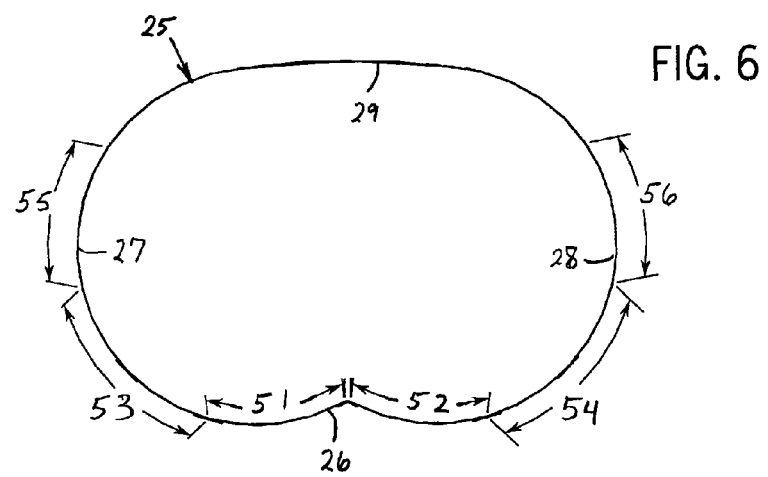
FIG. 6 is a schematic front elevation of the zoned heat transfer system of FIG. 5.

Referring now to FIGS. 5 and 6, the zoned heat transfer system 50 of this embodiment has multiple heat transfer zones. Toward the bottom of the vat 7, two lower heat transfer zones 51, 52 are defined along the bottom wall 26 of the shell 25. The lower heat transfer zones 51, 52 are positioned to direct heat transfer activity generally vertically up through the bottom of the vat 7, with lower heat transfer zone 51 being positioned below one agitator shaft 45 (FIG. 3) and lower heat transfer zone 52 being positioned below another agitator shaft 45 (FIG. 3).

Still referring to FIGS. 5 and 6, a pair of intermediate heat transfer zones 53, 54 is positioned laterally beyond the lower heat transfer zones 51, 52. Intermediate heat transfer zone 53 is adjacent the lower heat transfer zone 51 and extends across (i) an upper and/or outer portion of the bottom wall 26 shown on the left side of FIG. 6, and (ii) a lower and/or inner portion of the sidewall 27. Intermediate heat transfer zone 54 is adjacent the lower heat transfer zone 52 and extends across (i) an upper and/or outer portion of the bottom wall 26 shown on the right side of FIG. 6, and (ii) a lower and/or inner portion of the sidewall 28. This arrangement provides the intermediate heat transfer zones 53, 54, with generally obliquely facing orientations, whereby the intermediate heat transfer zones 53, 54 direct heat transfer activity generally obliquely through the inside space 8, toward the middle of vat 7.

Still referring to FIGS. 5 and 6, a pair of upper heat transfer zones 55, 56 is positioned laterally beyond and also higher than the lower and intermediate heat transfer zones 51, 52, 53, 54, respectively. Upper heat transfer zone 55 is adjacent the intermediate heat transfer zone 53 and extends up the sidewall 27, toward the top wall 29. Upper heat transfer zone 56 is adjacent intermediate heat transfer zone 54 and extends up the sidewall 28, toward the top wall 29. The upper heat transfer zones 55, 56 are arranged in generally vertical orientations, so that they direct heat transfer activity generally transversely from the sides of the vat 7, toward each other. The upper heat transfer zones 55, 56 extend between upper and lower halves of the vat 7. In this embodiment, lower edges of the upper heat transfer zones 55, 56 are provided at a height that is about 35% of an overall height. Upper edges of the upper heat transfer zones 55, 56 are provided at a height that is about 80% of the overall height of the inside space 8 of vat 7. It is understood, however, that there can be any number of the various heat transfer zones and that the relative heights and positions may be other than those described, so long as the desired zoned temperature control may be achieved for a particular implementation.

Referring now to FIGS. 7 and 8, in this embodiment, the zoned heat transfer system 50 includes heat exchangers 70, a diverter system 80, controls 90, and a heat transfer fluid 100. A heat exchanger 70 is provided within each of the lower, intermediate, and upper heat transfer zones 51, 52, 53, 54, 55, and 56, respectively. Shown best in FIGS. 9 and 9A, each heat exchanger 70 has a pair of stacked sheets, with at least parts of the sheets being spaced from each other and defining a void space 105 therebetween, through which the heat transfer fluid 100 is conveyed. The inner sheet of this heat exchanger 70 is the shell 25 and the outer sheet 72 overlies or is outside of the outwardly facing surface of the shell 25.

Referring now to FIG. 10 which schematically shows the zoned heat transfer system 50 in an un-curled or flattened position, each heat exchanger 70 has an inlet 75 through which the heat transfer fluid 100 enters the heat exchanger 70 and an outlet 78 through which the heat transfer fluid 100 exits the heat exchanger. These heat exchangers 70 include longitudinally extending baffles 79 that connect the outer sheet 72 to the shell 25. Baffles 79 are positioned within the heat exchanger 70 so as to direct the heat transfer fluid 100 back and forth through the heat exchanger 70, while allowing both the inlet 75 and outlet 78 to be mounted to the heat exchanger 70 at the same side or end of the vat 7. In another embodiment, the inlets 75 and outlets 78 are provided at different sides or ends of the vat 7. In such other embodiment, the heat exchanger 70 does not include baffle 79, or the baffle 79 is configured to allow the heat transfer fluid 100 to enter and exit opposing ends of the heat exchanger 70.

Still referring to FIG. 10, in this embodiment, adjacent heat exchangers 70 and thus adjacent ones of the lower, intermediate, and upper heat transfer zones 51, 52, 53, 54, 55, and 56, respectively, are connected in series with each other so that the heat transfer fluid 100 flows sequentially through the lower, intermediate, and upper heat transfer zones 51, 52, 53, 54, 55, and 56, respectively. This is done by connecting an outlet 78 of a heat exchanger 70 to an inlet 75 of a downstream heat exchanger 70, whereby the inlet 75 of the downstream heat exchanger 70 intakes the heat transfer fluid 100 that is discharged from the preceding outlet 78 of the upstream heat exchanger 70. In this particular embodiment, a first series connection is made between the heat exchangers 70 of the lower, intermediate, and upper heat transfer zones 51, 53, 55, toward the left-hand side of FIG. 10. A second series connection is made between the heat exchangers 70 of the lower, intermediate, and upper heat transfer zones 52, 54, 56, toward the right-hand side of FIG. 10.

Referring now to FIGS. 7, 8, and 10, the heat transfer fluid 100 in this embodiment is divided into two distinct flow paths that are mirrored about a longitudinally extending centerline of the vat 7, flowing through (i) the lower heat transfer zone 51 and one or both of the intermediate and upper heat transfer zones 53, 55, and (ii) the lower heat transfer zones 52 and one or both of the intermediate and upper heat transfer zones 54, 56, respectively. In one embodiment, both of the lower heat transfer zones 51, 52 are controlled, heated and/or cooled in unison with each other, serving as a center of heat transfer activity within the vat 7. The additional heat transfer activity of the intermediate and upper heat transfer zones 53, 54, 55, 56 is mirrored about such center of heat transfer of the lower heat transfer zones 51, 52. This is done by controlling the intermediate and upper heat transfer zones 53, 54, 55, 56 in pairs to selectively permit series flow of the heat transfer fluid 100 from the lower heat transfer zones 51, 52 into the downstream intermediate heat transfer zones 53, 54 or all of the intermediate and upper heat transfer zones 53, 54, 55, and 56.

In another embodiment, in addition to or instead of such series connection of the lower, intermediate, and upper heat transfer zones 51, 52, 53, 54, 55, and 56, respectively, they are connected to each other in parallel. In this other embodiment, inlets 75 of heat exchangers 70 are connected to each other and outlets 78 are connected to each other, such that the heat transfer fluid 100 is divided and simultaneously flows through the respective heat exchanges 70.

Still referring to FIGS. 7, 8, and 10, regardless of the particular connection type between the heat exchangers 70, the hardware connecting them defines part of a diverter system 80 that controls flow of the heat transfer fluid 100. Diverter system 80 includes diverters 82 that control which one(s) of the lower, intermediate, and upper heat transfer zones 51, 52, 53, 54, 55, and 56, respectively, that the heat transfer fluid 100 can flow through, at any particular time. As shown in FIG. 4, diverters 82 are electromechanical valves that are actuated and controlled by controls 90. Controls 90 include an industrial computer or, e.g., a programmable logic controller (PLC), along with corresponding software and suitable hardware that allow a user to input operating parameters, such as a target size of a batch of food product, or a target temperature for the processing of the food product, the target temperature including desired variations of the temperature over time while processing a batch.

Still referring to FIGS. 7, 8, and 10, based on the information inputted by the user, the controls 90 determine and command (i) whether to heat or cool the heat transfer fluid 100 with a heating/cooling device 110, (ii) to what extent to heat or cool the heat transfer fluid 100 with the heat/cooling device 100, (iii) a suitable flow path of the heat transfer fluid 100 through the lower, intermediate, and upper heat transfer zones 51, 52, 53, 54, 55, and 56, respectively, and (iv) which of diverters 82 to actuate to establish the desired, suitable, flow path through the lower, intermediate, and upper heat transfer zones 51, 52, 53, 54, 55, and 56, respectively. In one embodiment, the controls 90 include a lookup table that has information about where a splash zone 120 (FIGS. 3 and 8) may be located upon the shell 25, as a function of, e.g., the particular type of food that will be the vat contents for a batch, the particular target size of the batch, and corresponding performance characteristics of vat components such as shaft rotation speed of the agitator system for that particular type of food. The splash zone 120 is generally defined at a fill-height for the respective batch, in other words, at a height upon the sidewalls 14, 15 at which the vat contents extends for the batch and may extend slightly above and below such fill-height, for about four or fewer inches above and below the fill height, optionally about 10 or fewer inches above and below the fill height. Based on the position of the estimated splash zone 120, the controls can command the diverter system 80 to direct heated or cooled heat transfer fluid 100 only to the lower, intermediate, and upper heat transfer zones 51, 52, 53, 54, 55, and 56, respectively, that will be positioned lower than the estimated splash zone 120, preventing any heat transfer fluid 100 from flowing through a lower, intermediate, and upper heat transfer zones 51, 52, 53, 54, and 56, respectively, that is provided at the same height upon the shell 25 as the splash zone 120 or higher than the splash zone 120.

Accordingly and referring yet further to FIGS. 7, 8, and 10, processing of a batch of food product occurs in the following way. In a representative application, a user inputs information into controls 90, informing the system that a batch of cheese will be a target size that corresponds to the amount of milk which will be introduced into the vat 7 for the batch. In one embodiment, that is sufficient information and the controls 90 retrieve a corresponding target temperature for the batch or target temperatures for different phases of the processing of the batch. In another embodiment, such target temperature(s) values are entered manually by the user. Based on the target temperature and/or the target size of the batch, the controls 90 determine a suitable flow path through the heat transfer system 50.

Still referring to FIGS. 7, 8, and 10, if the controls 90 determine that a target temperature is warm enough to burn milk that may splash or slosh onto the splash zone 120, then controls 90 determine a flow path through the heat transfer system 50 that deactivates or excludes any heat transfer zones upon which the splash zone 120 is defined. For example, if the splash zone 120 projects or is defined at a height of the vat 7 that the upper heat transfer zones 55, 56 occupy, then the diverters 82 are actuated so that the heat transfer fluid 100 only flows through the lower and intermediate heat transfer zones 51, 52, 53, 54, respectively, which are lower than the splash zone 120.

Operation of the zoned heat transfer system 50 as described above establishes a temperature differential a location at or near the splash zone 120, namely a temperature differential between (i) the upper heat transfer zones 55, 56, and (ii) the lower and intermediate heat transfer zones 51, 52, 53, 54, respectively. In this example, the upper heat transfer zones 55, 56 transmit heat at a lower rate, optionally not at all, to the side walls 14, than does the lower and intermediate heat transfer zones 51, 52, 53, 54, respectively. In one embodiment, a temperature differential is established by heating the upper heat transfer zones 55, 56 to some extent, although to a lower temperature(s) than the lower and/or intermediate heat transfer zones 51, 52, 53, 54, respectively, are heated. This may be done by introducing relatively cooler heat transfer fluid 100 or a lesser amount of the same temperature heat transfer fluid 100 into the respective lower and upper heat transfer zones 51, 52, 53, 54, 55, 56, respectively, across which the temperature differential is established.

Various alternatives and embodiments are contemplated as being within the scope of the following claims particularly pointing out and distinctly claiming the subject matter regarded as the invention.

We claim:

1. A vat system for processing liquid or semi-liquid compositions, comprising:
   a vat that includes a bottom wall and side walls extending upwardly from the bottom wall;
   a zoned heat transfer system including multiple heat exchangers arranged at locations relative to different portions of at least one of the bottom and side walls of the vat,
   wherein the multiple heat exchangers include a first heat exchanger with an upper edge defining an upper boundary of the first heat exchanger at a first relatively lower height with respect to an overall height of the vat and a second heat exchanger with an upper edge defining an upper boundary of the second heat exchanger at a second relatively higher height with respect to the overall height of the vat, and wherein each of the first and second heat exchangers includes a pair of spaced apart sheets defining a void space therebetween through which a heat transfer fluid flows and wherein the first and second heat exchangers are arranged with respect to each other to selectively permit flow of the heat transfer fluid through the void spaces of the first and second heat exchangers for selectively transmitting heat to or removing heat from the respective different portions of the at least one of the bottom and side walls of the vat at different heights with respect to the overall height of the vat establishing a vertically defined temperature differential between the first and second.

2. The vat system of claim 1, the zoned heat transfer system further comprising at least one lower heat transfer zone and at least one upper heat transfer zone.

3. The vat system of claim 2, wherein the heat transfer fluid is directed through the at least one lower heat transfer zone and selectively directed from the lower heat transfer zone through the at least one upper heat transfer zone.

4. The vat system of claim 2, the zoned heat transfer system further comprising a pair of lower heat transfer zones extending across the vat bottom wall and a pair of upper heat transfer zones extending across a respective pair of the vat side walls.

5. The vat system of claim 4, the pair of upper heat transfer zones being controlled independently from the pair of lower heat transfer zones for transmitting heat to or removing heat from the sidewalls and bottom wall at different rates.

6. The vat system of claim 5, wherein the pair of upper heat transfer zones are fluidly connected to the pair of lower heat transfer zones such that the heat transfer fluid that flows through the pair of lower heat transfer zones can be selectively directed through the pair of upper heat transfer zones.

7. A vat system for processing liquid or semi-liquid compositions, comprising:
   a vat that includes a bottom wall and a side wall extending upwardly from the bottom wall;
   a zoned heat transfer system that includes multiple heat transfer zones defined within the vat and selectively transmitting heat to or removing heat from at least one of the bottom and side walls, the zoned heat transfer system including multiple heat exchangers arranged at locations corresponding to the multiple heat transfer zones at different heights with respect to the vat, wherein each of the multiple heat exchangers includes a pair of spaced apart sheets defining a void space therebetween through which a heat transfer fluid flows and wherein the heat transfer fluid within the void spaces of the multiple heat exchangers is (i) heated for transmitting heat to the at least one of the bottom and side walls of the vat, or (ii) unheated for removing heat from the at least one of the bottom and side walls of the vat; and
   a diverter system within the heat transfer system that selectively directs a flow of the heat transfer fluid through the void spaces of the multiple heat exchangers at the locations corresponding to the multiple heat transfer zones establishing a temperature differential between the different heights with respect to the vat.

8. The vat system of claim 7, the multiple heat transfer zones including:
   a lower heat transfer zone defined at the bottom wall of the vat; and
   an upper heat transfer zone defined at the side wall of the vat.

9. The vat system of claim 8, wherein the diverter system is in fluid communication with both of the lower and upper heat transfer zones and selectively directs the heat transfer fluid to flow through (i) only the lower heat transfer zone, or (ii) both of the lower and upper heat transfer zones.

10. The vat system of claim 9, the zoned heat transfer system including multiple upper heat transfer zones defined at the side wall and wherein the diverter system includes a diverter that is provided between the multiple upper heat transfer zones and can be actuated to direct a flow of the heat transfer fluid through a single one of the multiple upper heat transfer zones.

11. The vat system of claim 10, each of the heat exchangers having (i) an inlet through which the heat transfer fluid enters the heat exchanger, and (ii) an outlet through which the heat transfer fluid exits the heat exchanger.

12. The vat system of claim 11, wherein inlets of at least some of the heat exchangers are connected to each other, such that the heat transfer fluid enters the respective heat exchangers in parallel.

13. The vat system of claim 11, wherein inlets of some of the heat exchangers are connected to respective outlets of others of the heat exchangers, such that the heat transfer fluid flows through the respective heat exchangers in series.

\* \* \* \* \*